(12) United States Patent
Olivier, III et al.

(10) Patent No.: US 9,079,313 B2
(45) Date of Patent: Jul. 14, 2015

(54) NATURAL HUMAN TO ROBOT REMOTE CONTROL

(75) Inventors: Charles F. Olivier, III, Bothell, WA (US); Jean Sebastien Fouillade, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 803 days.

(21) Appl. No.: 13/048,123

(22) Filed: Mar. 15, 2011

(65) Prior Publication Data

US 2012/0239196 A1    Sep. 20, 2012

(51) Int. Cl.
| | |
|---|---|
| *G05B 15/00* | (2006.01) |
| *G05B 19/00* | (2006.01) |
| *B25J 11/00* | (2006.01) |
| *B25J 3/04* | (2006.01) |
| *B25J 13/02* | (2006.01) |
| *G06F 3/01* | (2006.01) |
| *G06F 3/03* | (2006.01) |
| *B25J 9/16* | (2006.01) |

(52) U.S. Cl.
CPC ............... *B25J 11/0015* (2013.01); *B25J 3/04* (2013.01); *B25J 9/1689* (2013.01); *B25J 13/02* (2013.01); *G06F 3/012* (2013.01); *G06F 3/017* (2013.01); *G06F 3/0304* (2013.01); *G05B 2219/40174* (2013.01); *G05B 2219/40176* (2013.01)

(58) Field of Classification Search
CPC ............ B25J 9/1689; B25J 3/04; B25J 13/02; B25J 11/0015; B25J 13/08; G06F 3/0304; G06F 3/012; G06F 3/017; G05B 2219/40174; G05B 2219/40176

USPC ............. 700/245, 259; 901/1, 2, 47; 382/103, 382/107, 181, 259; 318/568.12, 568.16
See application file for complete search history.

(56) References Cited

U.S. PATENT DOCUMENTS

| | | | |
|---|---|---|---|
| 6,016,385 A | 1/2000 | Yee et al. | |
| 6,175,772 B1 * | 1/2001 | Kamiya et al. | 700/31 |

(Continued)

FOREIGN PATENT DOCUMENTS

JP         2000163178 A  *  6/2000  ............... G06F 3/00

OTHER PUBLICATIONS

Kim, et al., "Robust visual servo control of robot manipulators with uncertain dynamics and camera parameters", Retrieved at <<http://www.springerlink.com/index/33M4P2052616271N.pdf>>, International Journal of Control, Automation, and Systems, 2010, pp. 308-313.

(Continued)

*Primary Examiner* — Dalena Tran
*Assistant Examiner* — Jaime Figueroa
(74) *Attorney, Agent, or Firm* — Miia Sula; Judy Yee; Micky Minhas

(57) ABSTRACT

The subject disclosure is directed towards controlling a robot based upon sensing a user's natural and intuitive movements and expressions. User movements and/or facial expressions are captured by an image and depth camera, resulting in skeletal data and/or image data that is used to control a robot's operation, e.g., in a real time, remote (e.g., over the Internet) telepresence session. Robot components that may be controlled include robot "expressions" (e.g., audiovisual data output by the robot), robot head movements, robot mobility drive operations (e.g., to propel and/or turn the robot), and robot manipulator operations, e.g., an arm-like mechanism and/or hand-like mechanism.

20 Claims, 8 Drawing Sheets

(56) References Cited

U.S. PATENT DOCUMENTS

| | | | |
|---|---|---|---|
| 6,215,890 B1* | 4/2001 | Matsuo et al. | 382/103 |
| 6,560,511 B1* | 5/2003 | Yokoo et al. | 700/245 |
| 6,720,949 B1* | 4/2004 | Pryor et al. | 345/158 |
| 6,741,911 B2 | 5/2004 | Simmons | |
| 7,065,490 B1* | 6/2006 | Asano et al. | 704/275 |
| 7,076,334 B2* | 7/2006 | Sabe et al. | 700/245 |
| 7,113,848 B2* | 9/2006 | Hanson | 700/245 |
| 7,308,112 B2* | 12/2007 | Fujimura et al. | 382/103 |
| 7,515,992 B2* | 4/2009 | Sawada et al. | 700/245 |
| 7,526,362 B2 | 4/2009 | Kim et al. | |
| 7,606,411 B2 | 10/2009 | Venetsky et al. | |
| 7,738,997 B2* | 6/2010 | Lin | 700/245 |
| 7,762,665 B2 | 7/2010 | Vertegaal et al. | |
| 7,904,204 B2* | 3/2011 | Lin | 700/245 |
| 8,103,382 B2* | 1/2012 | Root et al. | 700/248 |
| 8,463,006 B2* | 6/2013 | Prokoski | 382/128 |
| 2002/0181773 A1* | 12/2002 | Higaki et al. | 382/190 |
| 2005/0108660 A1* | 5/2005 | Cheng et al. | 715/863 |
| 2005/0166163 A1* | 7/2005 | Chang et al. | 715/863 |
| 2005/0271279 A1* | 12/2005 | Fujimura et al. | 382/203 |
| 2007/0142965 A1* | 6/2007 | Lin | 700/245 |
| 2008/0050999 A1* | 2/2008 | Jang et al. | 446/337 |
| 2008/0085048 A1* | 4/2008 | Venetsky et al. | 382/153 |
| 2008/0285791 A1* | 11/2008 | Suzuki et al. | 382/100 |
| 2009/0027337 A1* | 1/2009 | Hildreth | 345/158 |
| 2009/0183125 A1* | 7/2009 | Magal et al. | 715/863 |
| 2010/0103106 A1* | 4/2010 | Chui | 345/166 |
| 2010/0161122 A1* | 6/2010 | Lin | 700/245 |
| 2010/0306715 A1* | 12/2010 | Geisner et al. | 715/863 |
| 2011/0144804 A1* | 6/2011 | Song et al. | 700/246 |
| 2011/0288684 A1* | 11/2011 | Farlow et al. | 700/264 |

OTHER PUBLICATIONS

MacDonald, et al., "Novelty processing in human robot interaction", Retrieved at <<http://citeseerx.ist.psu.edu/viewdoc/download?doi=10.1.1.101.321&rep=rep1&type=pdf>>, Apr. 2, 2004, pp. 12.

McMillan, Grant R., "The technology and applications of gesture-based control", Retrieved at <<http://ftp.rta.nato.int/public/PubFulltext/RTO/EN/RTO-EN-003/$EN-003-04.pdf>>, Presented at the RTO Lecture Series on "Alternative Control Technologies: Human Factor Issues", Bretigny, France, and Ohio, USA, Oct. 1998, pp. 12.

Ashutosh, et al., "A gesture based interface for remote robot control", Retrieved at <<http://www.ifp.illinois.edu/~ashutosh/papers/tencon.pdf>>, 1998, pp. 158-161.

* cited by examiner

US 9,079,313 B2

NATURAL HUMAN TO ROBOT REMOTE CONTROL

BACKGROUND

When controlling a robotic device (or more simply, a robot), there are a wide variety of functions that a user can perform. For example, depending on the robot's capabilities, the user may be able to operate controls to drive the robot's drive train, control its head movements, determine how the robot's outputs signal expressions (e.g., via a display and/or sound), and control at least one manipulator (e.g., an arm and/or grabbing mechanism).

Current control applications and human interface devices provide an overly complex set of controls that can overwhelm a user and get in the way of the general goal of controlling the robotic device as desired. What is needed is a way to control a robotic device in a straightforward, intuitive manner.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which user movements and/or facial expressions are captured by an image and depth camera, resulting in skeletal data and/or image data that is used to control a robot's operation. This allows a user to control a robot based upon natural and intuitive movements and expressions. The control may be in a real time, remote (e.g., over the Internet) telepresence session.

In one aspect, the skeletal data and/or image data are processed into commands and/or data that control components of the robot, including robot "expressions" (e.g., comprising visible, audible and/or other output via output mechanisms of a robot expression system), robot head movements, robot mobility drive operations (e.g., to propel and/or turn the robot), and robot manipulator operations. The manipulator may be an arm-like mechanism and may include or be coupled to a hand-like mechanism.

In one aspect the robot receives information corresponding to skeletal data and/or expression data captured by an image and depth camera, and processes the information to control the operation of one or more components of the robotic device. The information may comprise the skeletal data and/or expression data, or may comprise action commands and/or accompanying data computed from the skeletal data and/or expression data at a remote device and transmitted to the robot.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a straightforward, intuitive interface mechanism that enables a user to control a remote robotic device (robot) using his or her own natural body movements and/or facial expressions. In one implementation, this is accomplished during a telepresence session, comprising a session in which a user takes over control of a robot and receives video, audio and/or possibly other sensory information from that robot.

In one implementation, the control is accomplished by using technology found in depth cameras (e.g., such as provided in Microsoft® Kinect™ technology) to read the position of a user's skeleton and/or user's expression. Corresponding position and expression information is sent to the robot, where it is translated into actions that reflect the user's movements and/or expressions.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in capturing movement and/or robotic devices in general.

Figure 1:
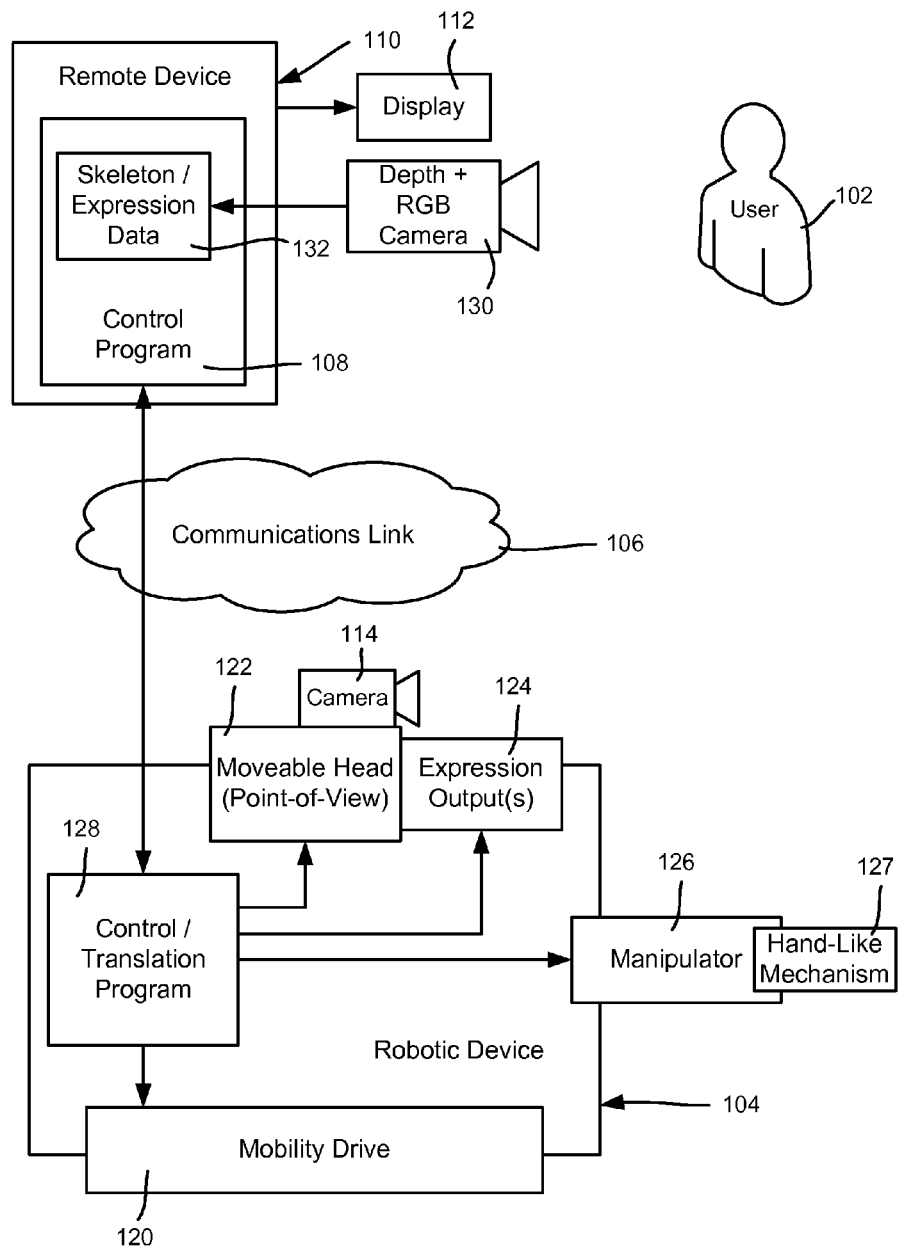
FIG. 1 is a block diagram representing example components of an environment/system for remotely controlling a robot using natural body movements and/or facial expressions.

FIG. 1 shows components of one example implementation in which a user 102 is remote with respect to a robotic device (robot) 104 during a telepresence session, and controls the robot 104 via information sent over a communications link 106. In this implementation, the user 102 may be located on a network (e.g., the communications link 106 comprises the Internet) that is generally different from the robot's network (such as a local network).

The remote user 102 communicates with the robot 104 through a control program 108 (e.g., an application) on a remote device 110, such as a personal computer, mobile phone, game console or other such device. The control program 108, an example of which is described below, may comprise a standalone application or may be embedded in a browser/operating system component. The remote device 110 is typically coupled to a display 112, including by which the user 102 can receive video or image data to view what the robot's camera 114, if present, is currently capturing. The robot 104 may similarly be provided with a microphone by which the user 102 may hear (via remote device speakers) what the robot 104 can audibly sense.

Also represented in FIG. 1 are various components of the robot 104, including a mobility drive 120, moveable head 122 (e.g., horizontal and/or vertical rotation to provide a camera captured point-of-view). Note that the head may be any shape and size, and indeed, may mostly comprise the camera 114 possibly along with some mechanism to move the camera in at least one dimension. Also shown are one or more expression outputs 124 (forming an expression system), and a manipulator 126. Each of these components is controlled by a control/translation program 128 executing on the robot 104, as described below. As can be readily appreciated, other components, or less than all components shown in FIG. 1, may be present in a given implementation.

To obtain the data for controlling the robot's components, the technology described herein combines depth camera technology with robotics telepresence technology. More particularly, user interaction technology such as provided in Microsoft® Kinect™ uses a depth and image (e.g., RGB) camera 130 to provide skeleton tracking data and facial expression data. In general, when the data from such cameras are processed, each pixel has R, G, B values (or the like, e.g., CMY values) and a depth value. Note that separate image and depth cameras may capture such data, and thus may be used in place of the illustrated camera 130. However for purposes of explanation a single depth and RGB camera 130 is described herein, and "depth and image camera" as used herein refers to a single such camera or any number of cameras of any type that may be combined to provide depth and image data from which skeletal data and/or facial expression data may be produced.

Turning to examples of different modes of control, when the user 102 is located in front of the camera 130 and is having a telepresence session with the robot 104, the camera 130 captures the user's body movements and facial changes. These movements and changes are processed into skeleton positioning and facial expression data 132, e.g., via Microsoft® Kinect™ technology. As described below, the control program 108 processes the data 132, and if the movement or expression is recognized as a qualified movement/expression, sends an action command or the like along with accompanying information to the robot 104, whereby the robot 104 is controlled to react to the user's natural actions.

In one aspect, the user 102 is able to control expression output(s) 124 of the robot 104, provided that the robotic device is able to display some type of expression, (such as through a physical audiovisual display such as an LCD, LED, projector, speaker and/or the like, and/or in a mechanical fashion, e.g., a shutter that gives the impression of a winking eye). By way of example, when the user 102 smiles, the robot 104 may be controlled to react by expressing a smile using its expression system, which may include visible and/or audible output; conversely when the user 102 looks sad, the robot 104 reacts by expressing sadness. When the user 102 closes his or her eyes, the robot 104 may effectively react by expressing closed eyes using its expression system.

Note that these are only examples of mapping some user facial expressions to robot output. Instead of (or in addition to) facial expressions, a user's body movements may control the robot's expression. For example, a gesture such as shaking a fist may be translated to output that conveys anger through the robot's expression system. A user thumbs-up gesture may result in a robot "smile," and so forth. Notwithstanding, while any such expression and/or gesture mapping scheme may be present, generally the mapping scheme is one that is intuitive to the user 102 to initiate, and such that that the robot's resultant behavior is reasonably understood by anyone interpreting the robot's actions.

In one aspect, the moveable head 122, if present, may be controlled so as to move the robot's head/point-of-view to match a person's head movement up to the capabilities of the robot 104. For example, when the user 102 nods his or her head, the robot 104 may be controlled to react by nodding its point of view in real time to match the user's nod. If the user 102 shakes his or her head, the robot 104 may be controlled to react by shaking its head/point-of-view in real time to match the user's shake.

When the user 102 looks up or down, the robot 104 may look up or down, respectively, as controlled in real time. Left or right head rotation is similarly controllable. Note however that the user 102 generally wants to or needs to face the camera 130, and thus the robot 104 may be configured to move its head 122 and remain in that moved position even after the user 102 resumes a normal head position, until otherwise instructed. For example, the user 102 may temporarily look up, and then resume looking straight into the camera, so that the user 102 can see what the robot 104 is looking up at. The robot 104 may remain looking up, and only move back to looking straight ahead if the user 102 instructs it to change (e.g., the user looks down). Thus, two head movements may be needed to instruct the robot 104 to look down after looking up; e.g., one user head movement down while the robot 104 is looking up may restore the robot 104 to looking straight ahead, with a second look down used to instruct the robot 104 to look down instead of straight ahead, and so on.

The robot 104 may be provided with at least one manipulator 126 that is controlled based upon the user's movements as captured in the skeletal data 132. For example, when a user lifts an arm in front of the depth camera, the robot 104 lifts its manipulator 126. When a user closes his or her hand, the robot 104 closes its hand-like mechanism 127 (e.g., a grabbing device), and likewise opens it when the user's hand reopens. User arm extension and sideways arm movement may also control the manipulator's movement.

With respect to the mobility drive 120, the user may pretend to walk or run forward (e.g., while remaining place), whereby the robot 104 drives forward as long as the user keeps the forward walking motion. Walking/running speed may be detected and reflected by the robot, at least to some maximum speed. If the user pretends to turn to the right or left (e.g., does so momentarily but then moves back to center to face the cameras), the robot 104 turns right or left, respectively. The turning angle may be determined within a reasonable range, e.g., in fifteen degree increments, and/or by the length of time the user is turned before turning back, e.g., a brief turn corresponds to one small turning angle, a medium length turn to a medium turning angle, a long turn to a larger turning angle, and so forth.

In each of the above example situations, the depth and RGB camera 130 captures the user's body and/or facial movements, which the control program 108 converts to skeleton data and expression data 132. This data 132 is processed with corresponding information sent to the remote robot 104 in real time (although it is feasible to record the information for the robot 104 to playback later). The robot 104 uses the received data to convey expressions via its outputs 124, to adjust the position of its head 122, to adjust the position of its manipulator 126, and/or to control the mobility drive 120.

Note that the data-to-movement translation processing is typically performed before transmission to the robot 104. For example, the skeleton/expression data 132 are processed at the remote device 110 into action (movement and/or expression) commands (types) and data, which are then sent over the communications link 106. This is generally more efficient than sending the captured skeletal and expression data for interpretation by the robot 104; however it is feasible to do so as an alternative, e.g., a depth and RGB camera may simply send what it captures to the robot 104, which then processes the data into robot movements and expressions that reflect the user actions.

FIGS. 2-7 are example flow diagrams showing how user actions control robot behavior during a remote telepresence session 220. Note that the flow diagrams are from the perspective of the robot, with the user and user device considered as "remote."

Figure 2:
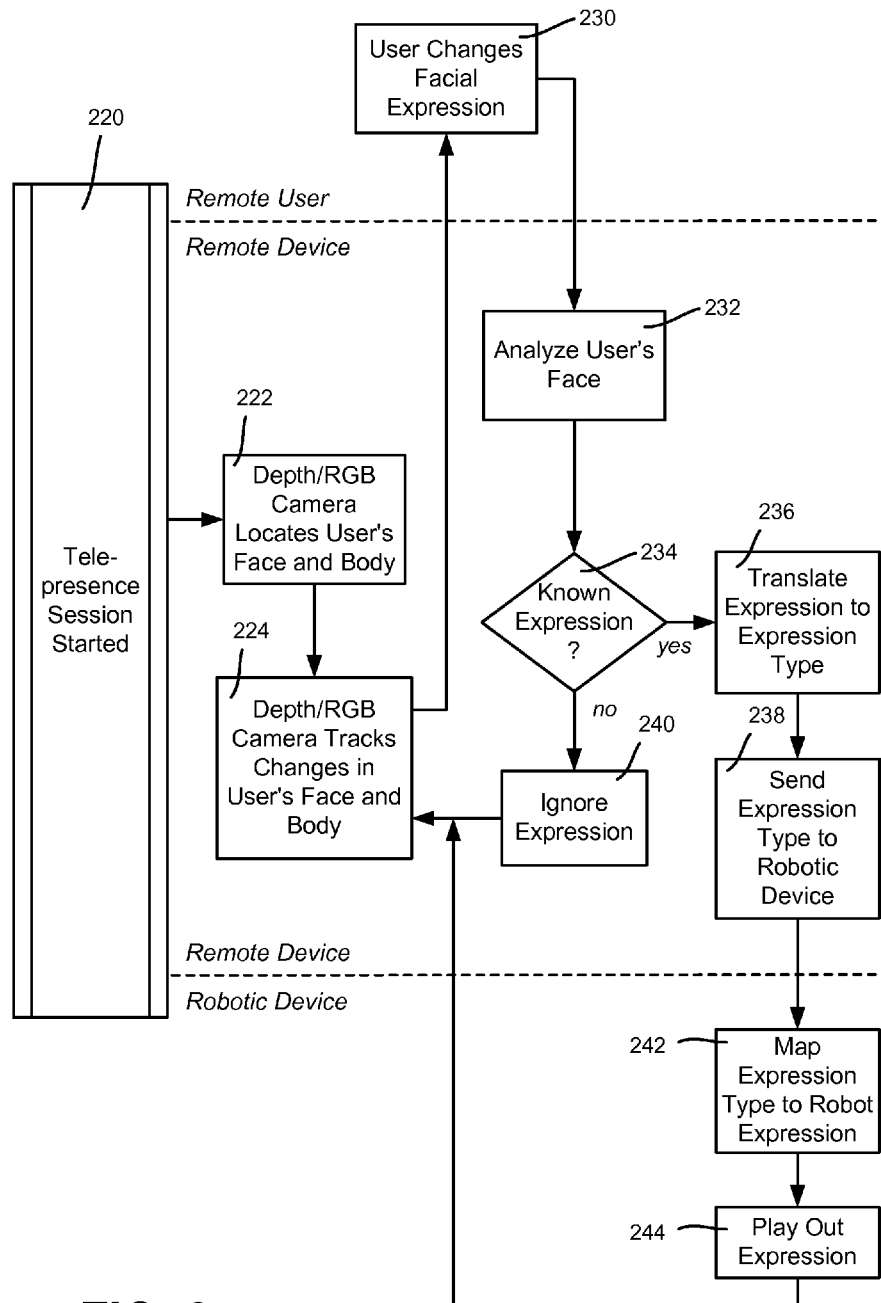
FIG. 2 is a flow diagram showing example steps for controllably outputting expressions on a robot via user facial expressions.

In FIG. 2, when the telepresence session 220 has started, the depth and RGB camera locates the user's face and body (block 222), and tracks any changes thereto (block 224). FIG. 2 is directed towards the example logic for processing facial expressions, which the user may change (block 230) as desired. Note that as mentioned above, it is feasible to map a user non-facial gesture to a robot expressive output; however FIG. 2 only considers user facial expressions-to-robot expressions for purposes of simplicity.

If there is a change (e.g., determined beyond some reasonable threshold), the process analyzes the user's face at step 232. If step 234 determines that the expression is a known expression, e.g., in a data store of such expressions, then step 234 branches to step 236 as described below. Note that known image processing and facial recognition technology can detect various expressions, and moreover, a user may perform customized training for a personal robot to facilitate improved recognition accuracy, for example. If the expression is not one that is known, (or is known to be a non-qualified expression such as involuntary eye-blinking rather than intentional winking), the expression is ignored (block 240).

If known to be an expression, step 236 translates the expression data to an expression type (e.g., an action command), which is then sent to the robot at step 238. The robot receives the expression type, maps it to a robot expression (e.g., corresponding to one or more electrical signals to drive the outputs) at step 242, and thereby plays out the expression at step 244. In this manner, the robot is able to produce visible output or other output (e.g., audio and/or tactile output) representative of the user's expression. The expression that is output by the robot may be temporary (e.g., a display of a smile that fades away after a few seconds), or may continue as long as the user maintains the expression or does not change to a new expression.

Figure 3:
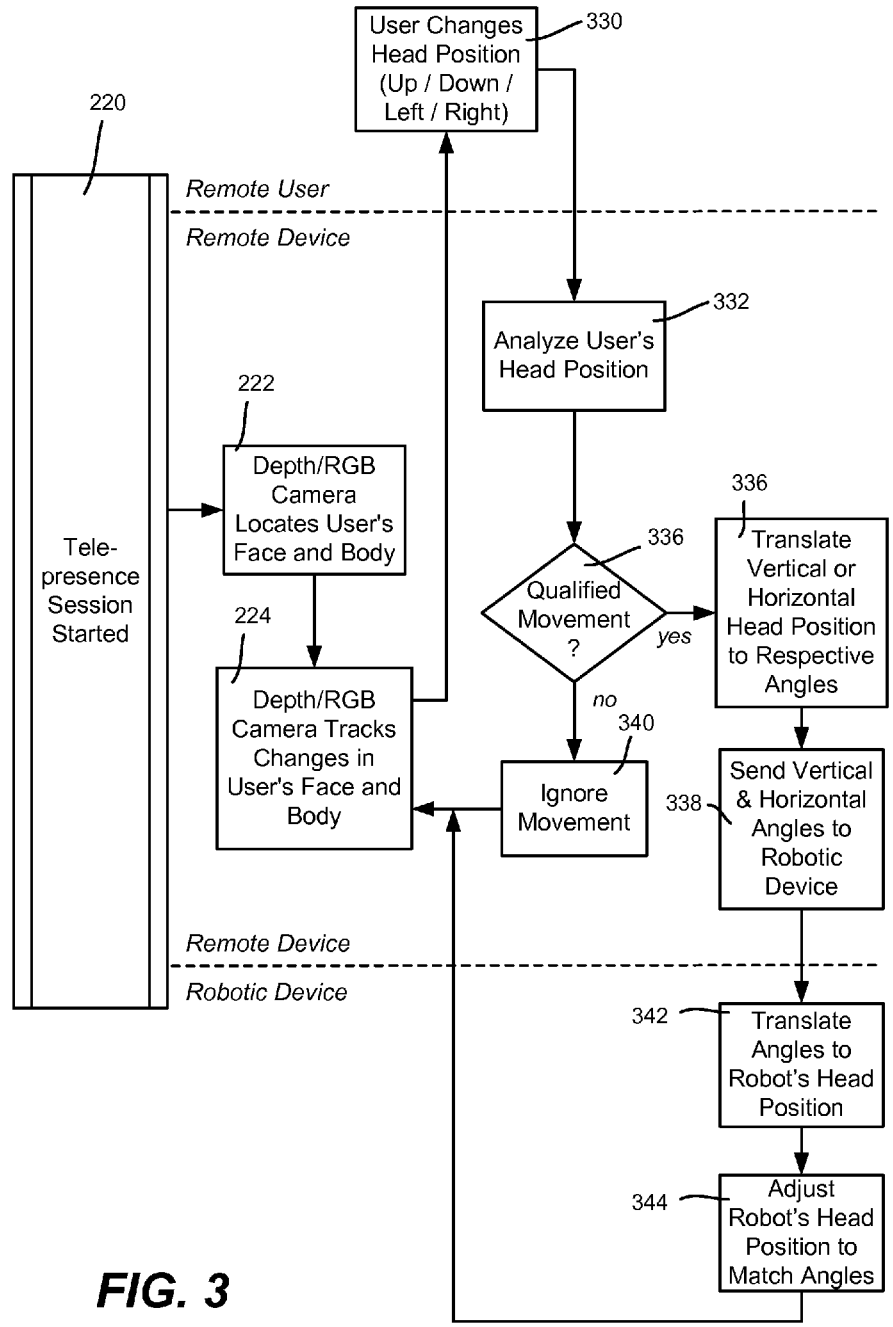
FIG. 3 is a flow diagram showing example steps for controllably moving a robot's head via user head movements.

The steps of FIG. 3 may generally occur at the same time as the steps of FIG. 2, and are directed to a process that tracks the user's head movement for control of the robot. As described above, in FIG. 3, during the telepresence session 220, the depth and RGB camera locates the user's face and body (block 222), and tracks any changes thereto (block 224). FIG. 3 is directed towards the example logic for processing head movement, which the user may change (block 330) as desired. Note that it is feasible to map a user's expression or non-head movement to a robot head movement (e.g., user hand gestures may result in moving the robot's head); however FIG. 3 only considers user head movement-to-robot head movement for purposes of simplicity.

If there is a change in head position, (e.g., determined beyond some reasonable threshold), the process analyzes the user's head position at step 332. If step 334 determines that the head movement qualifies as an intended head movement to be mirrored by the robot, then step 334 branches to step 336, otherwise the movement is ignored at step 340. Note that the change may be from an initial "zero" position, so that a user who is very slowly moving his or her head will eventually have the movement qualify rather than always being considered an inadvertent movement relative to the previous head position. Also, as described above, step 336 may consider whether the user's head movement is not for the intended purpose of moving the robot's head, but rather for the purpose of moving back to look at the camera/display, in which case it can be ignored until another qualified head movement occurs.

If a qualified head movement, step 336 translates vertical or horizontal head position to respective angles, and sends these angles as data (e.g., along with an appropriate "move head vertically" or "move head horizontally" action command), which is then sent to the robot at step 338. The robot receives the action command and data, computes the robot's vertical and/or angular head position (block 342) and adjusts the robot's head position accordingly at step 344.

Figure 4:
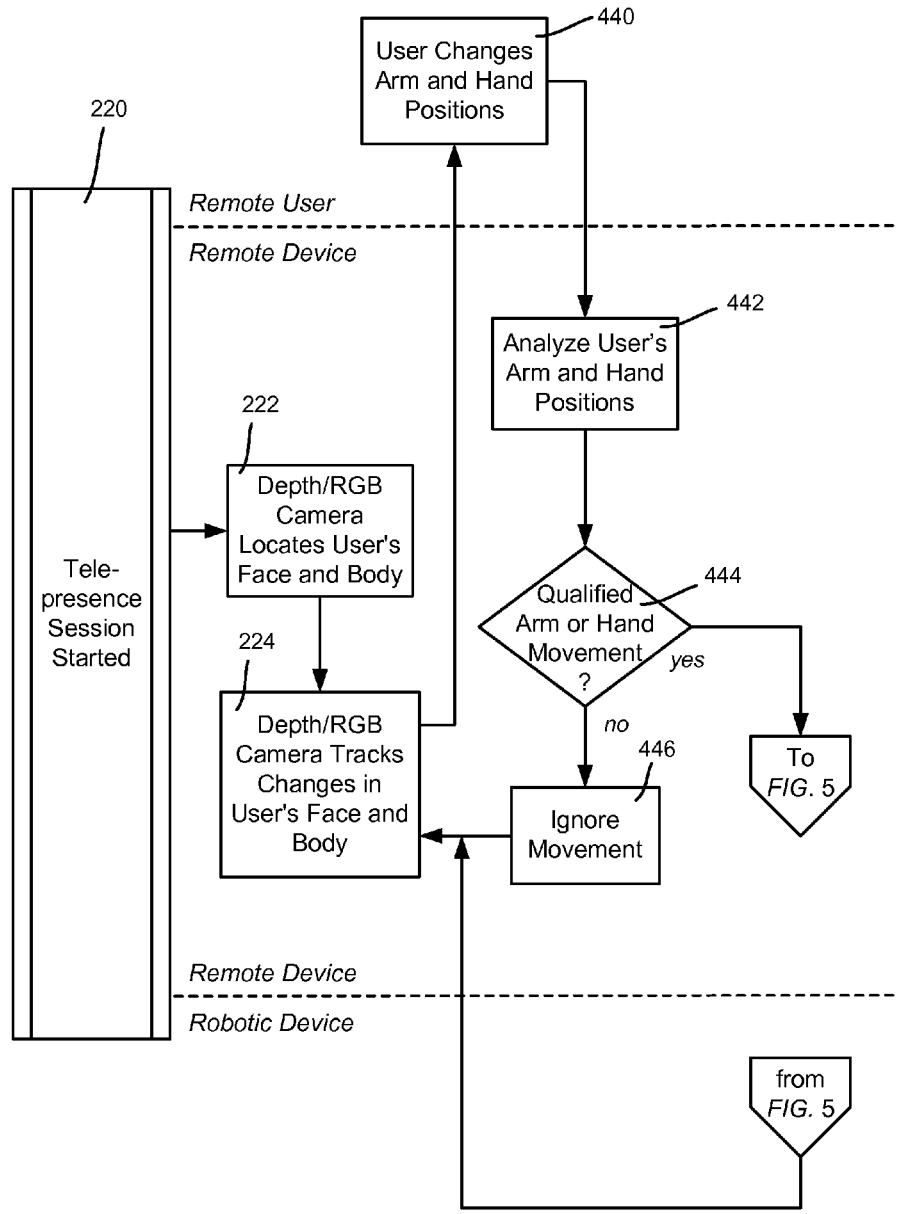
FIGS. 4 and 5 comprise a flow diagram showing example steps for controllably moving a robot's arm or grabbing mechanism via user arm and hand movements.
Figure 5:
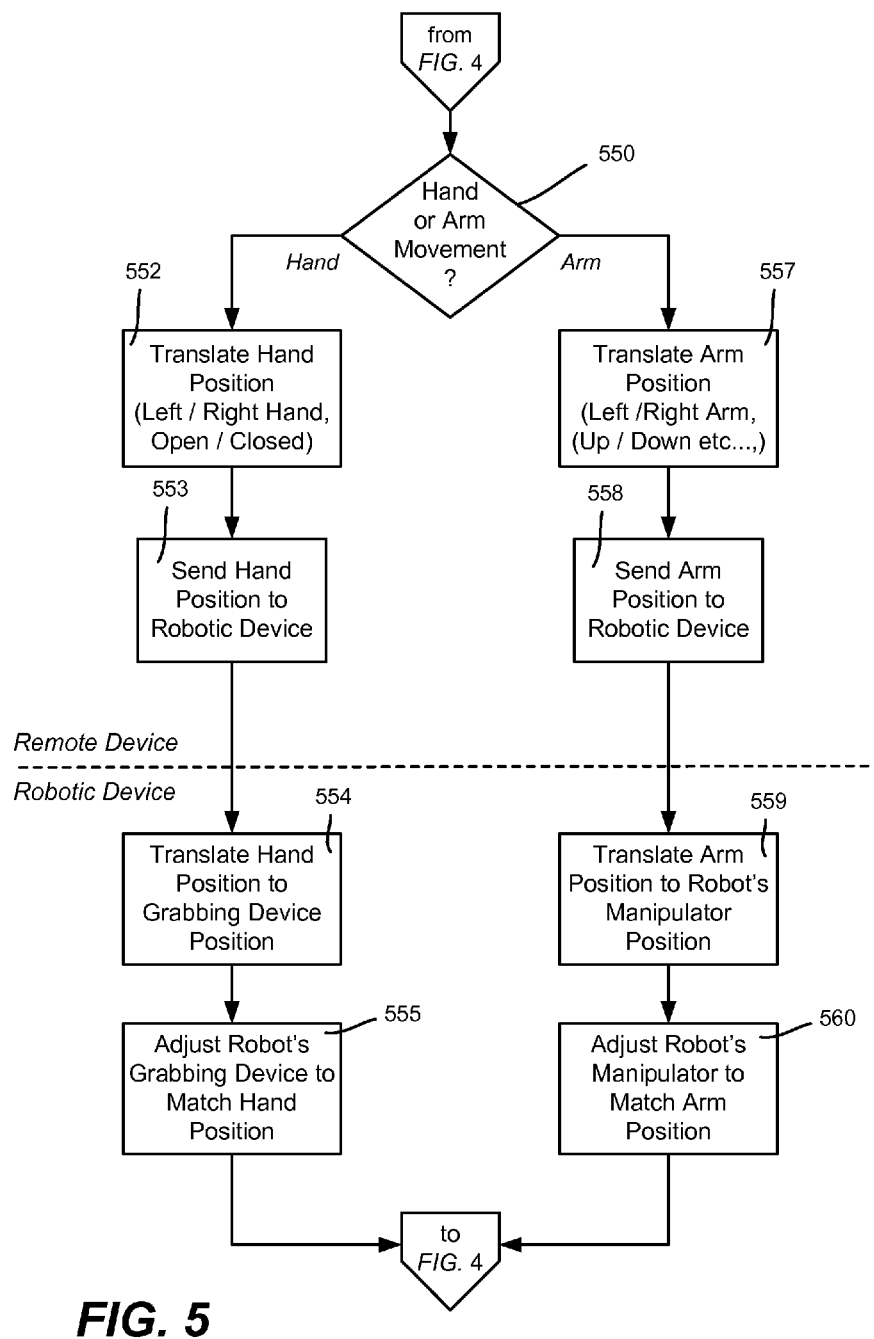

FIGS. 4 and 5 comprise an example flow diagram directed towards processing user arm and/or hand movements during the remote telepresence session 220. Again, blocks 222 and 224 represent locating the user's face and body (block 222) and tracking any changes thereto (block 224).

If there is a change in arm or hand position (e.g., determined beyond some reasonable threshold) at step 440, the process analyzes the change at step 442. Note that such detection technology is known and used in Kinect™ Xbox® games, for example. If step 444 determines that the movement is a qualified movement, then step 444 branches to FIG. 5 as described below. Otherwise, the movement is ignored (block 446).

If determined to be a qualified arm and/or hand movement, step 550 of FIG. 5 differentiates between the hand and arm. Hand position may be separately processed for each hand, and as exemplified in FIG. and 5 may be open or closed; however other hand positions may be detected in alternative implementations, e.g., pointing, rotating to palm up or palm down, and so on, which a more sophisticated robot "hand" may mirror. In any event, steps 552-555 represent processing the data into a command for operating the robot's hand-like mechanism (e.g., grabbing device), sending the command, receiving it at the robot and acting on it accordingly. In this way, for example, the robot's grabbing device may be operated by the user's actual hand movement.

If step 550 instead decides that the qualified movement was an arm (movement may be separately processed for each arm), the arm position data is processed. Depending on the robot's manipulator capabilities, the arm data may capture movement in one, two or three dimensions, e.g., up-and-down, left-and-right, and/or extended forward/pulled back amounts. Steps 557-560 represent processing the data into a command for operating the robot's manipulator, sending the command, receiving it at the robot and acting on it accordingly. In this way, for example, the robot's manipulator is operated by the user's actual arm movement.

As can be readily appreciated, the logic of FIGS. 4 and 5 may be run fast enough to detect both hand and arm position and operate the robot accordingly. However, as robot technology evolves, such as to provide a hand with fingers, hand and arm processing may be separately handled, such as for programming simplicity.

Figure 6:
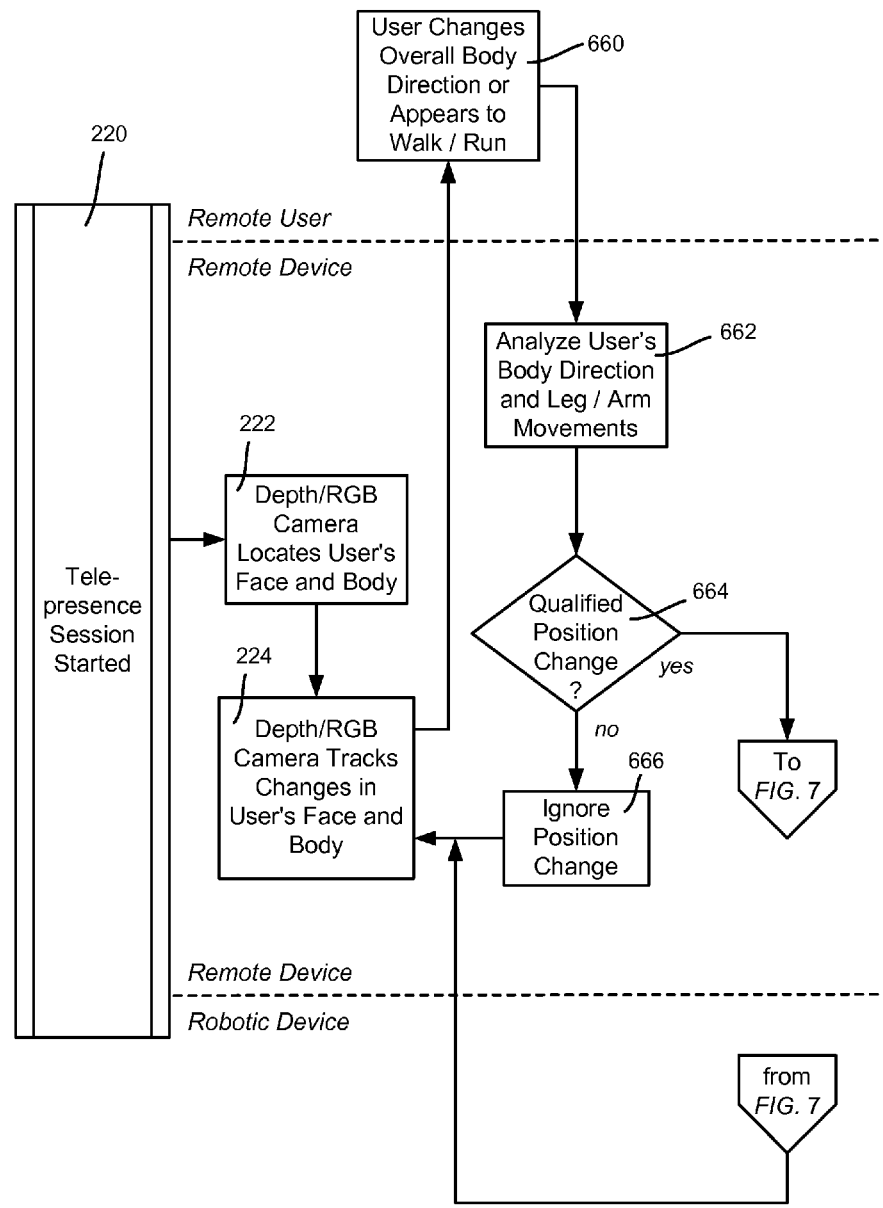
FIGS. 6 and 7 comprise a flow diagram showing example steps for controllably driving a robot's locomotion using walking and turning movements.
Figure 7:
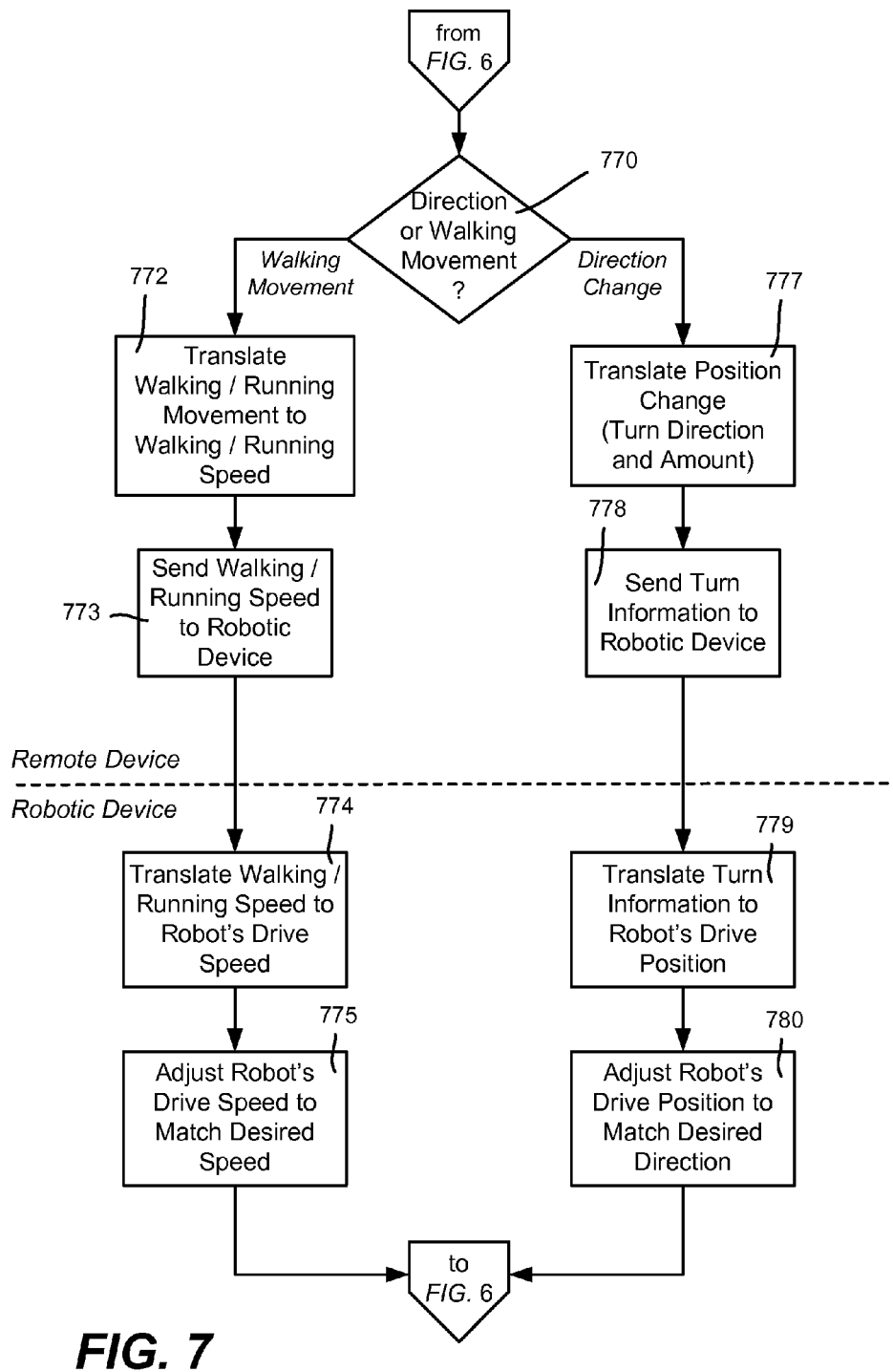

FIGS. 6 and 7 comprise an example flow diagram directed towards processing user movements that result in robot drive-related movements, e.g., walking or turning during the remote telepresence session 220. Again, blocks 222 and 224 represent locating the user's face and body (block 222) and tracking any changes thereto (block 224).

If there is a change in the user's body direction or the user starts to walk (or run) at step 660, the process analyzes the movements at step 662. Note that such detection technology, including speed based on movements, is known and used in Kinect™ Xbox® games, for example. If step 664 determines that the movement is a qualified body position change, then step 664 branches to FIG. 7 as described below. Otherwise, the movement is ignored (block 666). Note that with respect to processing a user's turn, the turning back by the user to face the camera after a first turn may be ignored, such that a subsequent turn is needed to change the direction.

If a qualified body position change, step 770 of FIG. 7 differentiates between the walking movement and the direction change; (in an alternative implementation, direction changes versus walking movement may be processed separately). As mentioned above, walking and running that control the robot's mobility mechanism to propel the robot may be reflected in speed data, which is captured and communicated to the robot for acting thereon as represented via steps 772-775. Note that secondary or alternative input may be used for speed data, e.g., a handicapped user or user unable to walk fast or run fast or for a long time may be able to use a gesture to accelerate and decelerate the robot to a desired speed.

Turning the robot operates similarly to walking/running, except that turn direction and amount are captured, sent, processed and acted on via steps 777-780. Note that the use of direction allows a user to spin the robot in a desired direction towards the final angle, including more than one-hundred-eighty degrees.

As described above, turning may be in angular increments that do not require the user to get a general direction exact, and indeed, the robot may need to adjust the requested direction anyway, such as to avoid obstacles. Note that finer angular control may be provided, such as based on secondary input. For example, a user who is simply turning has the turn detected, which can result in a coarse approximation of the turn direction. However, if the user signals the control program 108 or robot in some way, such as by making a certain gesture while turning, the movement may be in finer increments, e.g., to bump the turn direction in a small increment to obtain a more precise direction.

As can be seen, there is provided depth camera technology used with robotic telepresence to control a robotic device. The user's facial expressions and movements enable the user to control a remote device using a natural, intuitive interface.

Exemplary Computing Device

As mentioned, advantageously, the techniques described herein can be applied to any device. It can be understood, therefore, that handheld, portable and other computing devices and computing objects of all kinds including robots are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
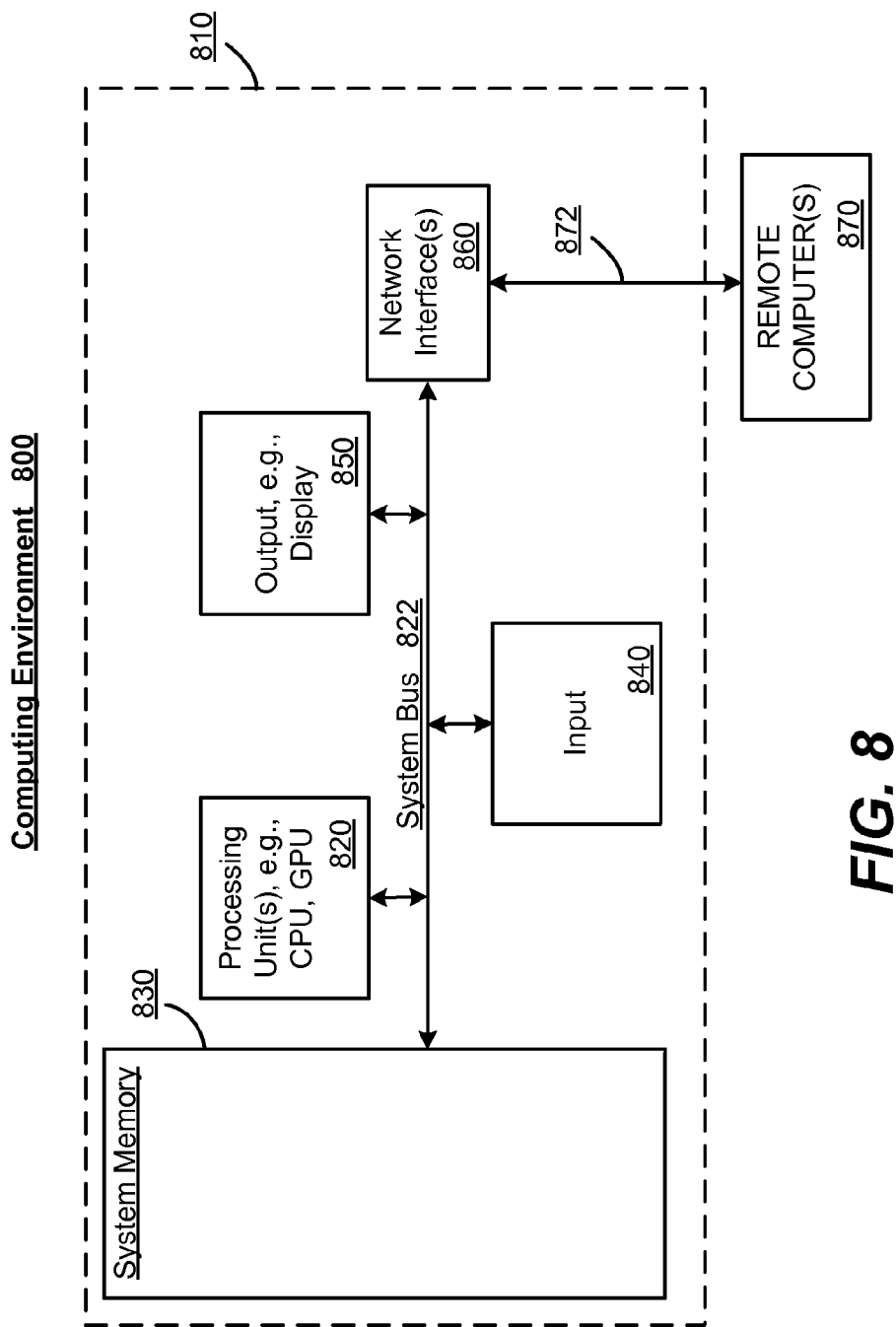
FIG. 8 is a block diagram representing an exemplary non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a system comprising:
a control program implemented in a remote device relative to a robotic device and configured to receive image data and depth data captured at a location remote from the robotic device, convert the image data and the depth data into skeletal data, process the skeletal data into one or more action commands that when processed by the robotic device operate one or more components of the robotic device, and transmit the one or more action commands to the robotic device over a connection to control the robotic device.

2. The system of claim 1 further comprising:
a communications link by which the one or more action commands are communicated to the robotic device over the connection from a network associated with the remote device to a different network associated with the robotic device.

3. The system of claim 2 wherein the communications link comprises an Internet connection.

4. The system of claim 1 wherein the one or more components of the robotic device comprise a mobility drive, and wherein the one or more action commands control the mobility drive to propel the robot or turn the robot, or both propel the robot and turn the robot.

5. The system of claim 1 wherein the one or more components of the robotic device comprise a robot head, and wherein the one or more action commands control the vertical or horizontal angle, or both the vertical and horizontal angle, of the robot head.

6. The system of claim 1 wherein the one or more components of the robotic device comprise a manipulator, and wherein the one or more action commands control the operation of the manipulator.

7. The system of claim 1 wherein the one or more components of the robotic device comprise a robot hand-like mechanism, and wherein the one or more action commands control the operation of the robot hand-like mechanism.

8. The system of claim 1 wherein the one or more components of the robotic device comprise an expression output mechanism, wherein the image data and the depth data include facial expression data, wherein the control program is further configured to process the facial expression data into an expression type that controls the expression output mechanism of the robotic device.

9. In a computing environment, a method performed at least in part on at least one processor, comprising:
receiving image data and depth data;
identifying head movement of a user via the image data and the depth data;
detecting changes to the head movement of the user; and
transmitting data corresponding to the detected changes, including transmitting data representing the head movement, to a robot that uses the data corresponding to the changes detected to control operation of one or more components of the robot to match head movement of the robot with the head movement of the user.

10. The method of claim 9 further comprising:
receiving visual data from a point-of-view of the robot responsive to the head movement of the robot.

11. The method of claim 9 further comprising:
identifying skeletal data of the user via the image data and the depth data;
detecting changes to the skeletal data corresponding to arm movement of the user; and
transmitting skeletal change data corresponding to the changes to the skeletal data to the robot to operate a robot manipulator based on the skeletal change data.

12. The method of claim 9 further comprising:
identifying skeletal data of the user via the image data and the depth data;
detecting changes to the skeletal data corresponding to hand movement of the user; and
transmitting skeletal change data corresponding to the changes to the skeletal data to the robot to operate a robot hand-like mechanism based on the skeletal change data.

13. The method of claim 9 further comprising:
identifying expression data of the user via the image data and the depth data;
detecting changes to the expression data, including determining an expression type; and
transmitting data corresponding to the determined expression type to the robot to operate a robotic expression system to output a robotic expression on the robot based on the data corresponding to the determined expression type.

14. The method of claim 9 further comprising:
identifying skeletal data of the user via the image data and the depth data;
detecting changes to the skeletal data corresponding to walking or turning movements of the user; and
transmitting skeletal change data corresponding to the changes to the skeletal data to the robot to operate a robot mobility drive mechanism to propel or turn the robot, or both propel and turn the robot, based on the skeletal change data.

15. The method of claim 9 wherein transmitting the data occurs in real time during a remote telepresence session to control operation of the robot, and further comprising:
receiving sensory information corresponding to the operation of the robot during the remote telepresence session transmitted from one or more sensors coupled to the robot.

16. One or more computer storage devices having computer-executable instructions, which in response to execution by a computer, cause the computer to perform steps comprising:
receiving information at a robot corresponding to skeletal data converted from image data and depth data, the image data and the depth data captured from a user via a control device remote from the robot, the control device including user interaction technology and configured to convert the image data and the depth data to the skeletal data;
processing the information to control operation of one or more components of the robot; and
transmitting other information corresponding to the operation of the one or more components of the robot to the control device, the other information including sensory data captured by one or more sensors coupled to the robot as the one or more components of the robot are controlled using the received information.

17. The one or more computer storage devices of claim 16 having further computer-executable instructions comprising:
receiving information at the robot corresponding to facial expression data converted from the image data and the depth data; and
processing the information to control operation of an expression system of the robot.

18. The one or more computer storage devices of claim 16 wherein the information comprises one or more action commands or data, or both action commands and data, computed at the control device based upon the skeletal data.

19. The one or more computer storage devices of claim 16 wherein processing the information to control the operation of one or more components of the robot comprises at least one of controlling robot head movements, controlling robot manipulator movements, or controlling a robot mobility drive.

20. The one or more computer storage devices of claim 19 having further computer-executable instructions comprising:
receiving information at the robot corresponding to facial expression data converted from the image data and the depth data; and
processing the information to control operation of an expression system of the robot.

* * * * *